No. 782,380. PATENTED FEB. 14, 1905.
E. F. BUTLER.
COCKEYE.
APPLICATION FILED APR. 23, 1904.
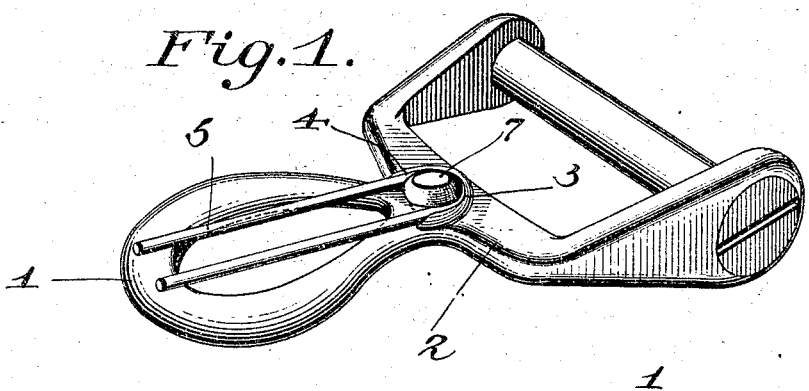
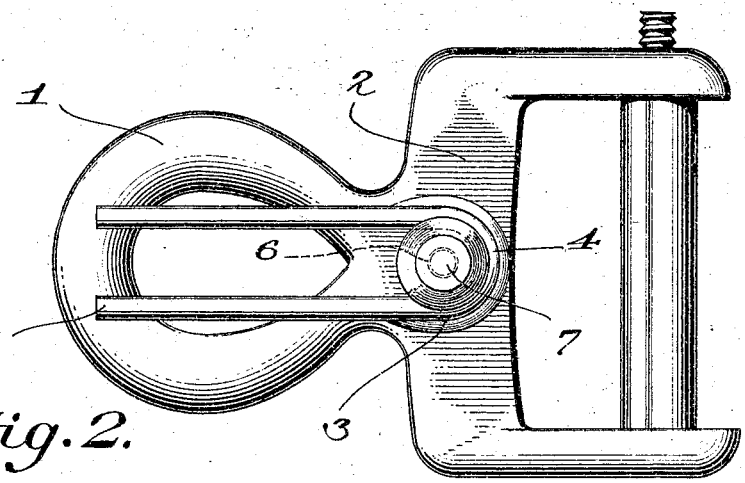
Edward F. Butler, Inventor, No. 782,380. Patented February 14, 1905.

UNITED STATES PATENT OFFICE.

EDWARD FRANKLIN BUTLER, OF WHITEWATER, WISCONSIN.

COCKEYE.

SPECIFICATION forming part of Letters Patent No. 782,380, dated February 14, 1905.

Application filed April 23, 1904. Serial No. 204,632.

*To all whom it may concern:*

Be it known that I, EDWARD FRANKLIN BUTLER, a citizen of the United States, residing at Whitewater, in the county of Walworth and State of Wisconsin, have invented a new and useful Cockeye, of which the following is a specification.

This invention relates to cockeyes.

The object of the invention is in a certain and positive manner to prevent accidental disconnection of the cockeye from the hook of the swingletree, to obviate rattling, and to reduce the cost of manufacture of such devices to a minimum.

With the above and other objects in view, as will appear as the nature of the invention is better understood, the same consists in the novel construction and combination of parts of a cockeye, as will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that various changes as to shape, proportion, and exact manner of assemblage may be made without departing from the spirit thereof.

In the drawings, Figure 1 is a view in perspective of a cockeye constructed in accordance with the invention, showing the same equipped with a safety-spring attachment. Fig. 2 is a view in elevation.

Referring to the drawings, 1 designates the cockeye, which is of the shape commonly in use, except that its shank 2 is provided with a socket 3 to receive the crest 4 of the safety-spring attachment 5. As herein shown, the socket is approximately U-shaped, thus to conform to the bend of the safety attachment; but it is to be understood that the invention is not to be limited to this precise form of the crest of the attachment and of the socket, as other contours may be given to these parts without departing from the spirit of the invention.

The shank is provided with a transverse orifice 6, through which is passed a rivet 7, the head of which is of sufficient width to bear upon the crest of the attachment, and thus firmly and securely clamp it within the socket, the free end of the rivet being upset thus to secure positive assemblage of the parts. The arms of the safety attachment are disposed in approximate parallelism, and their terminals bear upon the loop of the cockeye and being of resilient metal, preferably of tempered brass or steel, will engage with the hook of the swingletree with sufficient force to preclude any possibility of the accidental separation of the cockeye therefrom and at the same time will obviate rattling, a prolific cause of runaways.

The improvements herein defined will not require any change in structural arrangement of an ordinary cockeye other than to provide it with the socket 3, which may be readily done at the time the same is cast, and with the orifice 6 to receive the rivet. When the safety attachment is assembled with the cockeye in the manner described, it will be impossible for it to become detached therefrom without such force being applied thereto as would destroy it.

Having thus described the invention, what is claimed is—

1. A cockeye having its shank provided with a U-shaped socket and with an orifice, a U-shaped safety-spring having its crest disposed within the socket, and an attaching device engaging the said crest and orifice.

2. A cockeye having its shank provided with a U-shaped integral socket and with an orifice, a U-shaped safety-spring having its crest disposed within the socket and the terminals of its arms resting upon the loop of the cockeye, and a rivet engaging the said crest and the orifice.

In testimony that I claim the foregoing as my own I have hereto affixed my signature in the presence of two witnesses.

EDWARD FRANKLIN BUTLER.

Witnesses:
N. M. LITTLEJOHN,
T. M. BLACKMAN.